United States Patent [19]

Samuels

[11] Patent Number: 5,062,737
[45] Date of Patent: Nov. 5, 1991

[54] POWERED HEIGHT CHANGER FOR IMPROVED POWER CURBER

[76] Inventor: Terry G. Samuels, 489 Pine Hill Blvd., Geneva, Fla. 32732

[21] Appl. No.: 341,373

[22] Filed: Apr. 21, 1989

Related U.S. Application Data

[63] Continuation-in-part of Ser. No. 167,955, Mar. 14, 1988, abandoned.

[51] Int. Cl.$^5$ ............................................. E01C 19/52
[52] U.S. Cl. ...................................... 404/98; 404/104
[58] Field of Search ................... 404/85, 86, 96–98, 404/104, 105, 108, 110; 249/2, 8; 425/62–64

[56] References Cited

U.S. PATENT DOCUMENTS

| | | | |
|---|---|---|---|
| 2,587,321 | 2/1952 | Hohnke | 404/98 |
| 2,707,422 | 5/1955 | Canfield | 404/98 |
| 2,818,790 | 1/1958 | Canfield | 404/98 |
| 3,053,156 | 9/1962 | Jennings, Jr. | 404/98 |
| 3,161,117 | 12/1964 | Supject | 404/98 |
| 3,175,478 | 3/1965 | Smith | 404/98 |
| 3,261,272 | 7/1966 | Jennings, Jr. | 404/98 |
| 3,280,711 | 10/1966 | Jennings, Jr. | 404/98 |
| 3,292,511 | 12/1966 | Cheney | 404/98 |
| 3,566,760 | 3/1971 | Lafleur | 404/98 |
| 3,890,055 | 6/1975 | Rochfort | 404/98 |
| 3,915,584 | 10/1975 | Coho, Jr. | 404/98 |
| 4,115,023 | 9/1978 | Wada | 404/98 |
| 4,145,155 | 3/1979 | Ogaki | 404/98 |

FOREIGN PATENT DOCUMENTS

| | | | |
|---|---|---|---|
| 954733 | 9/1974 | Canada | 404/98 |
| 2116620 | 9/1983 | United Kingdom | 404/98 |

Primary Examiner—William P. Neuder
Attorney, Agent, or Firm—Julian C. Renfro

[57] ABSTRACT

In accordance with this invention I provide a curb laying machine designed to extrude curbing of molten asphalt or concrete in a parking lot or the like. This machine utilizes a wheeled chassis, and a curb mold removably carried on a lower portion of the chassis, with the lower edges of the mold in contact with the ground during the laying of curbing. An engine driven auger is utilized for bringing about the extrusion of curbing through the curb mold as the machine moves slowly forward. My machine utilizes a chassis, steerable front wheels supporting a forward portion of the chassis, and first and second rear wheels mounted on a rearward portion of the chassis. The improvement in accordance with my invention comprises a rapidly operable height changing mechanism associated with the first rear wheel, latter wheel being located in the immediate vicinity of the curb mold. This first wheel is disposed upon a pivoted framework mounted on a lower portion of the chassis, and also provided is an extensible fluidic actuator under control of the operator of the machine. This extensible fluidic actuator is operatively connected to the pivoted framework, and serving, when caused by the machine operator to extend, to rapidly bring about a degree of lifting of the rear portion of the chassis, thus to remove the lower edges of the curb mold from ground contact, and thereby enabling the operator to turn or move the machine to a new operative position.

15 Claims, 5 Drawing Sheets

POWERED HEIGHT CHANGER FOR IMPROVED POWER CURBER

RELATIONSHIP TO PREVIOUS INVENTION

This is a Continuation-in-Part of my patent application entitled "Powered Height Changer for Power Curber," Ser. No. 167,955, filed Mar. 14, 1988, which application was abandoned with the filing of this patent application.

BACKGROUND OF THE INVENTION

For many years now it has been known in the art to pro vide an engine driven machine serving to extrude properly configured curbing onto the ground, typically onto a previously prepared sur face of a parking lot or the like. Such a machine is provided with steerable front wheels and heightwise adjustable rear wheels, and is further equipped with a hopper into which molten asphalt or already mixed concrete can be poured as the machine is caused to roll slowly along a given line established as the desired location for the curb.

A curb mold is removably attached in a lower rear portion of a machine of this type, and supported in an operational manner in relation thereto is an engine driven, shaft mounted auger. The molten asphalt or concrete poured into the hopper flows through an opening in the bottom of the hopper into the curb mold, with the rotation of the auger under the powerful influence of the engine causing the molten asphalt or concrete to be compacted into the curb mold. As the molten asphalt or concrete is extruded through the rear opening of the curb mold, the wheeled machine is caused in reaction thereto, to move forwardly under the guidance of an operator. The operator typically walks backwardly, while holding a T-handle or equivalent, so that he can readily control the directional attitude of the front wheels of the machine. In this way the operator can either lay a straight curbing, or he can lay the curbing in a curved configuration, as may be required in a particular instance.

The rear wheels of a machine of this type do not support the entire weight of the rear portion of the machine, for the curb mold is equipped with lower edges that slide along in firm contact with the surface of the parking lot or other such location, and the curb mold thus supports a distinct portion of the weight of the machine.

In view of the fact that the lower edges of the curb mold thus carry a substantial portion of the weight of the machine, and the machine may weigh more than 1000 pounds, it would be very difficult for the operator to change direction of movement of the machine without taking some or all of the weight of the rear portion of the machine off of the curb mold. Such a change of direction is obviously necessary from time to time, for although some runs of curbing are straight, it is inevitable that it will be necessary to lay curbing at a different angle to, or in a different relationship with, the prior runs of curbing.

The machine illustrated herein is generally along the lines of a machine manufactured by Power Curbers, Inc. of Salisbury, North Carolina 28144. In a typical Power Curbers machine, the rear wheels are to some degree extensible at the behest of the operator, with the rear wheels in the normal or operative position permitting the lower edges of the curb mold to slide along the ground surface. The rear wheels, however, when extended, cause the rear portion of the machine to move away from the ground surface to a sufficient extent that the lower edges of the curb mold will be free of ground contact. At that point the machine can be turned, or even loaded onto a truck or trailer, for transport to another location.

The height change mechanism utilized in the Power Curbers machine is mechanical, with the operator being provided with a type of crank that is turned manually. When the operator wishes to change the direction in which the machine moves, he or his assistant declutches the auger from the rotative influence of the engine, so that forward motion ceases. The operator then turns the crank in order to effect the extension of the rear wheels with respect to the chassis. This causes the lower edges of the curb mold to move away from ground contact, thus greatly simplifying the task of the operator moving the machine into a new alignment with respect to the parking lot, even to an entirely different location.

Unfortunately, the turning of the crank is a tiring operation, for during the course of laying many dozens if not hundreds of feet of curb in the course of a day, it will be necessary for the operator to crank the machine up and down many times in order that the curbing can be laid in a desired configuration.

It is in an effort to lighten the burden of moving the curb mold away from ground contact at direction changing times that the present invention was evolved.

Of some pertinence is the teaching represented by the Rochfort Pat. No. 3,890,055, entitled "Concrete Laying Machine," which issued as a U.S. Pat. on June 17, 1975.

It is most important to note that Rochfort describes in his Column 2, approximately at line 42, that he utilizes a "pair of height adjusting devices comprising, in this instance a threaded member 42 on the chamber operatively engaged in a correspondingly threaded tubular member or housing 43, each support a side of the body above one of the supporting wheel assemblies 13."

Column 2 of the Rochfort patent continues by stating "The member 43 is pivotally mounted at 44 to bracket 45 on the assembly 13. Actuating means, in this instance, a hydraulic motor 41 is adapted to drive the threaded member 42 whereby the or each side of the body may be raised or lowered."

It is obvious that a great deal of time will necessarily be consumed by Rochfort's elongate threaded members 42 going about raising the Rochfort frame, with a similar amount of time necessarily being consumed at such time as his frame is to be lowered so that the concrete curb laying operation may resume. In addition, exposed threads readily become fouled by dust as well as spilled concrete, necessitating a frequent cleaning of the threads if they are to be kept in operational condition.

In contrast, the present invention utilizes an extensible fluidic actuator, which can be manipulated in a matter of a few seconds, to cause the chassis of his machine to dependably raise and thus remove the lower edges of his curb mold from ground contact. No elongate threaded members, with attendant expense and slow response, are utilized or needed. As soon as the chassis has been raised, the operator can swing the instant curb laying machine to the desired new orientation, and that being accomplished, he can promptly bleed the fluid from the extensible fluidic actuator, so that the lower edges of the curb mold can quickly resume contact with the ground. Immediately after this, the laying of curbing in the new direction can be commenced without further delay.

SUMMARY OF THE INVENTION

A curb laying machine in accordance with this invention utilizes a wheeled chassis, with a curb mold of a known type removably carried on a lower portion of the chassis, with the lower edges of the mold being normally in contact with the ground during the laying of curbing.

Inasmuch as it is frequently necessary to lay curbing residing at an angle to the originally extruded curbing, it is necessary at such times to cause the curb mold to move upwardly, out of contact with the ground, so as to facilitate the curb laying machine being moved to a new operative position. Whereas it was previously necessary for the operator to manually crank the chassis of the curb laying machine upwardly in order to create the desired gap between the curb mold and the ground, or to utilize elongate threaded devices for this purpose, in accordance with this invention it is possible for the operator to bring about the lifting of the chassis by powered means, such as may involve hydraulics, thus obviating the necessity of the manual effort.

One of the rear wheels of the curb laying machine in accordance with this invention is mounted on a pivoted framework located on a lower portion of the chassis, with an extensible actuator being operatively associated with such pivoted framework. Therefore, upon the operator causing the actuator to elongate, the pivoted framework moves with respect to the chassis so as to lift the lower edges of the curb mold away from the ground, thus to facilitate the operator being able to reposition or transport the curb laying machine.

It is therefore to be seen that a principal advantage of my improved curb laying machine is to make it possible for an operator to bring about a height change of the chassis in a rapid and relatively effortless manner.

Another object of my invention is to provide an inexpensive yet highly effective arrangement for enabling an operator to quickly and effortlessly bring about desired height changes of the chassis of a curb laying machine.

It is still another object of my invention to provide an improved curb laying machine in which a pivoted framework operatively associated with an extensible actuator is utilized on the underside of the chassis of the machine, with the elongation of the actuator at the behest of the operator readily and rapidly bringing about a height change, making it possible for the operator to quickly realign the chassis of the machine in preparation for laying the next run of curbing.

It is most important to note that these objects could not be achieved in a powered height changer for a power curber by following the teachings of the Rochfort Patent No. 3,890,055.

These and other objects, features and advantages of my machine will become more apparent as the description proceeds.

DETAILED DESCRIPTION

Figure 1:
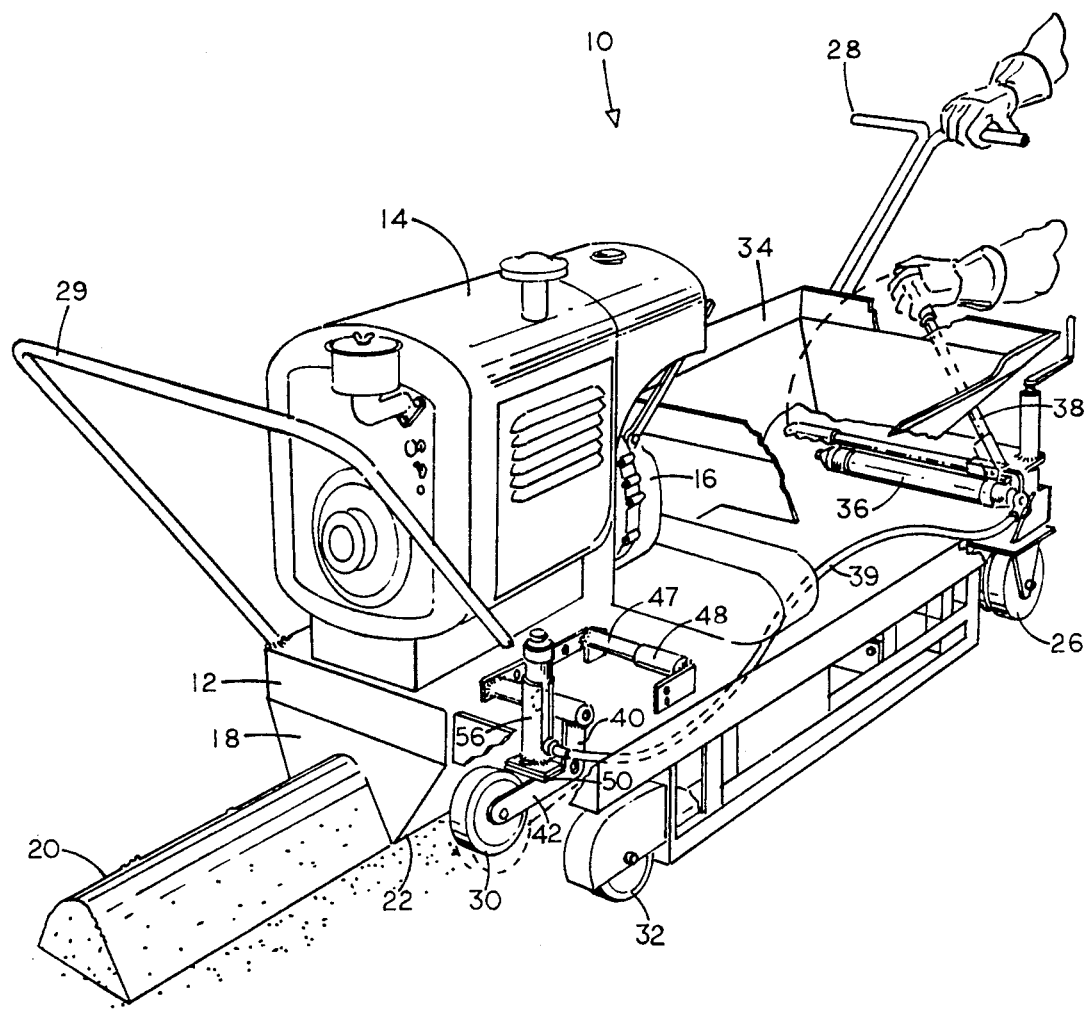
FIG. 1 is a perspective view of a curb laying machine in which certain portions have been removed so that the actuator and other components associated with the powered raising of the chassis of the machine at the behest of the operator can be readily seen.

This invention relates to a curb laying machine designed to extrude curbing of molten asphalt or concrete onto suitable supporting surfaces of a parking lot or the like. As seen in FIG. 1, the machine 10 comprises a wheeled chassis 12, mounted upon which is an engine 14. This engine is preferably a gasoline engine, arranged to drive a speed reduction unit, such as reduction gearing 16 which, as will hereinafter be seen, forms no part of the present invention.

Figures 5, 5A:
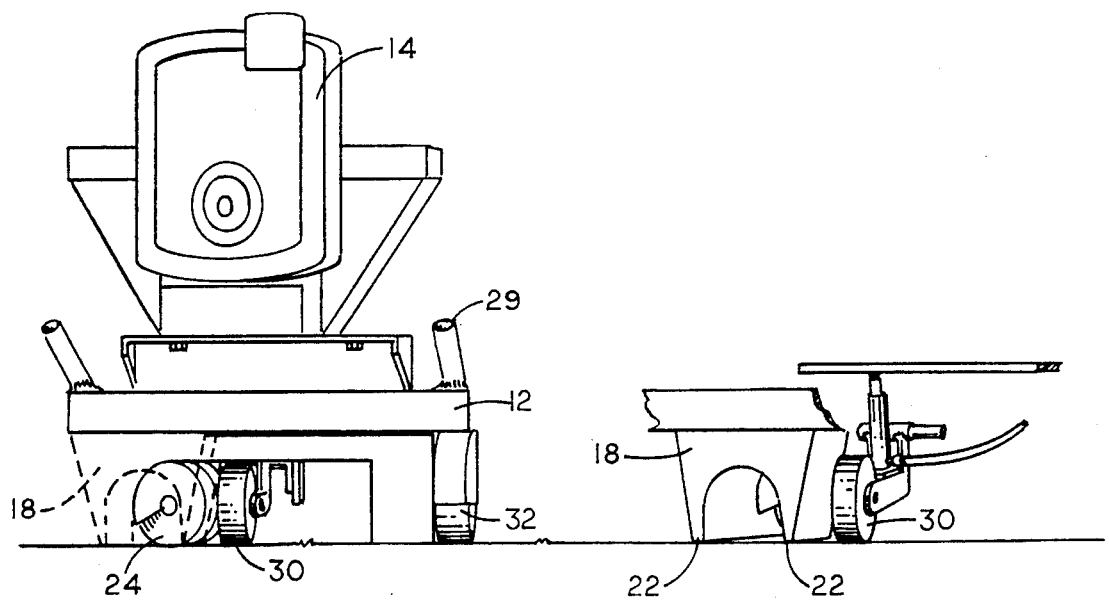
FIG. 5 is a ground level view showing a curbing mold in contact with the ground and revealing its relation to the engine driven auger.
FIG. 5A, located adjacent FIG. 5, provides a showing of significant additional details, but with the engine removed in the interests of clarity.
Figures 6, 6A:
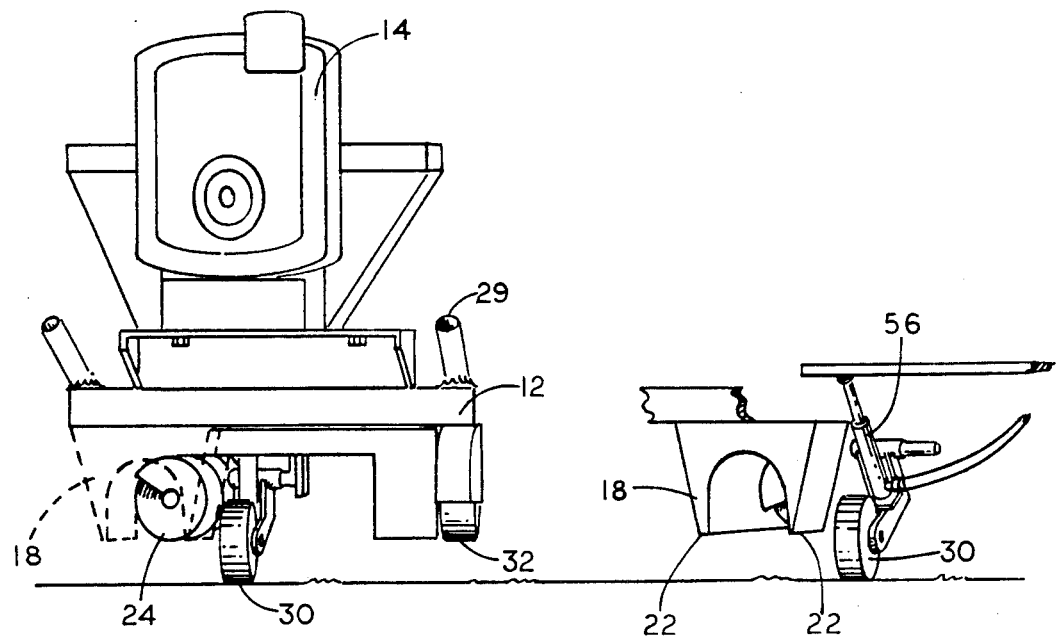
FIG. 6 is a view similar to FIG. 5, but here showing how the actuator and the pivoted framework can be utilized for bringing about the lower edges of the curb mold being moved away from contact with the ground.
FIG. 6A reveals in greater detail, just how the actuator has brought about the lower edges of the curb mold moving away from ground contact, with the engine omitted in this instance.

A curb mold 18 known by some as a "mule," is removably carried on a lower portion of the chassis 12, with the lower edges 22 of the curb mold being shown particularly clearly in FIGS. 5 and 5A to be in contact with the ground or other supporting surface during the laying of curbing. A shaft mounted auger 24, visible in FIGS. 5 and 6, is operatively supported and rotatably disposed at the forwardmost portion of the curb mold 18. The auger is driven in rotation from the reduction gearing 16 that is in turn driven by the engine 14. The engine driven auger 24 serves to pack the molten asphalt or concrete so tightly into the curb mold as to bring about the extrusion of curbing 20 out through the aperture located in the rear end of the curb mold, as clearly shown in FIG. 1, and in a readily understood manner, this causes the machine to move slowly forward.

Steerable front wheels 26 serve to support the front portion of the machine, and the front wheels may for example be made up of two pair of inflated tires, that are mounted on a rotatable framework pivotally mounted on the front part of the underside of the chassis 12. To this rotatable framework at the front of the machine a T-handle 28 is operatively connected. This arrangement enables the operator, by holding the T-handle, to steer or guide the machine such that it lays curbing 20 at the desired location. Some operators on certain occasions use a string tied to a series of carefully located stakes, to enable them to guide the machine in a straight line, when such is desired. At other times it is appropriate to snap a chalk line onto the asphalt or concrete. As thus far described, the machine 10 is in close accordance with the prior art.

First and second rear wheels 30 and 32 support a portion of the weight of the rearward portion of the machine 10, although the lower edges 22 of the curb mold 18 are in contact with the essentially flat ground surface during the laying of curb, and consequently, the first and second rear wheels do not support the weight of the entire rearward portion of the machine 10. The support arrangement for the wheel 30 will be discussed at greater length hereinafter, in view of its importance to this invention.

As will be understood by those skilled in the art, the operator, while holding the T-handle 28, walks rearwardly during the laying of curbing, with the curbing 20 being extruded from the rear of the machine, through the curb mold 18 onto the parking lot or other ground surface as the machine moves forward. The loop type rear handle 29 appearing in FIG. 1 near the engine 14 is used only during operations such as loading the machine 10 onto a truck, or offloading the machine from the truck, with the handle 29 typically not being used to guide the machine during the laying of curbing.

Visible in the embodiment shown in FIG. 1 is a hand operated pump 36, which is mounted on a forward portion on the chassis and equipped with a handle 38 that is well within the grasp of the operator at the same time he is holding onto the T-handle 28. A hydraulic line 39 connects the hand operated pump 36 to an actuator 56 disposed near the rear end of the chassis, and as will be discussed hereinafter, the pumping of the handle 38 by the operator rapidly brings about powered operation of the actuator 56 in a height changing direction.

A hopper 34 is operatively supported in an upper portion of the machine 10, which hopper is located immediately forward of the engine 14. There is a hole (not shown) in the bottom of the hopper 34, through which the molten asphalt or concrete flows from the hopper onto the previously-mentioned rotating auger 24, which of course serves to pack the molten asphalt or concrete tightly into the curb mold 18. The auger 24 is operatively supported on a shaft located at the forward end of the curb mold, so as a result of the auger being driven in rotation by the engine 14 through the reduction gearing 16, the molten asphalt or concrete is caused to flow in a continuous manner outwardly through the rear aperture of the curb mold 18. The curbing 20 depicted in FIG. 1 is illustrative of a general class of curbing extruded through the curb mold 18, and it is to be understood that a wide variety of different curb configurations can be brought about by the operator selecting a curb mold of the configuration preferred in a given instance.

It is to be noted that none of the aforementioned wheels 26, 30 and 32 are driving wheels, for the engine driven rotating auger 24 causing the molten asphalt or concrete to be extruded through the rear end of the curb mold 18 amounts to a force in the rearward direction that results in an equal and opposite force causing the forward motion of the machine 10.

It is customary for the operator of the machine 10 to be assisted by a "juker," whose job it is to walk alongside the machine 10, and to keep the hopper 34 filled with molten asphalt or premixed concrete as the curbing is being extruded. Also, the juker operates the clutch (not shown) of the machine, for from time to time, it is desirable during the laying of curbing, to cause the rotation of the auger to stop, without necessitating the engine 14 being turned off. When the auger stops rotating, forward motion of the machine ceases.

Because a juker thus assumes many of the routine tasks around the machine 10, it is unnecessary for the operator to be concerned with the matter of keeping the hopper filled, and the like, for in the interests of laying good, straight curbing, it is important that the operator not have frequent distractions.

Figure 2:
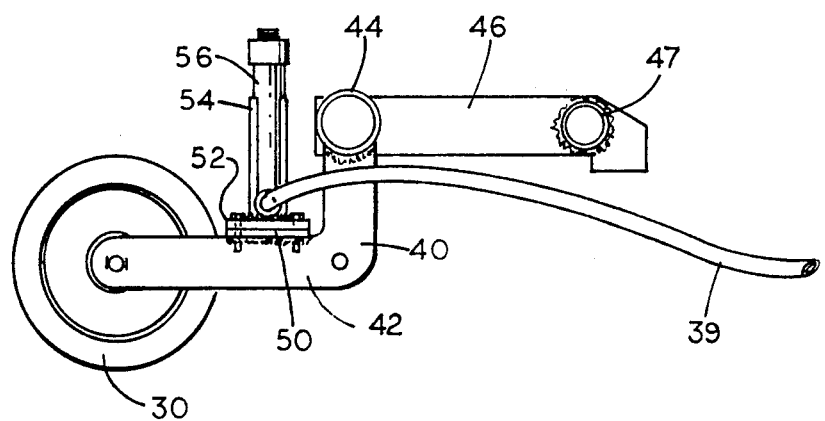
FIG. 2 is a fragmentary view to a larger scale of the pivoted framework utilized in accordance with this invention on a lower portion of the chassis, by which framework the lifting of the chassis and curb mold can be readily brought about by the operator.
Figure 3:
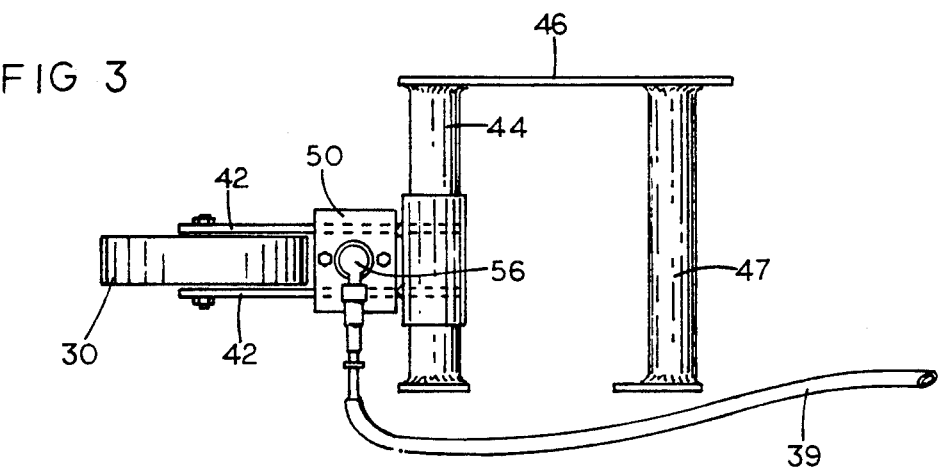
FIG. 3 is a view from above of the pivoted framework depicted in FIG. 2, with it being understood that the actuator utilized in this instance is supplied with pressurized hydraulic fluid through a flexible line or hose.
Figure 4:
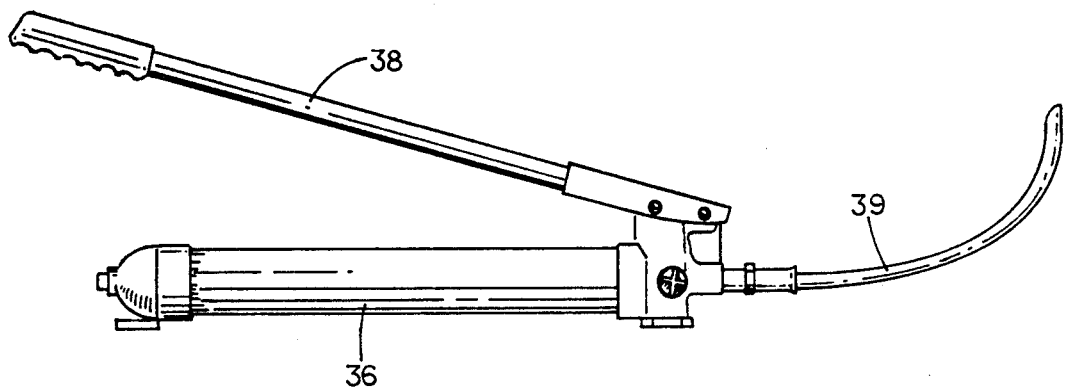
FIG. 4 is a view to a large scale of a hand operated hydraulic pump of a type that may be utilized to bring about rapid powered height changes in accordance with a first embodiment of this invention.

As indicated to some extent in FIG. 1, but depicted in greater detail in FIGS. 2 and 3, the first rear wheel 30 is mounted upon a pivotally mounted framework 40 provided in accordance with this invention, whereas the second rear wheel 32 serves as a stabilizing wheel. The framework 40 serving as a support for wheel 30 comprises a pair of elongate arms 42 which, as best seen in FIG. 3, extend in a generally horizontal manner around each side of the first rear wheel 30. These arms 42 are generally "L" shaped, and are welded or otherwise secured to a generally cylindrically shaped member 44, clearly visible in FIG. 3. The end of member 44 is welded or otherwise secured to a connecting member 46 of generally flat construction, the other end of which is welded or otherwise secured to a hollow pivot member 47, that is in a generally parallel relationship to the member 44. All of these components are of steel, securely welded together, and of rugged construction.

It is to be understood that the hollow pivot member 47 is normally placed upon, and is supported by, a stationary pivot member 48 that, as shown in FIG. 1, is in effect a part of the framework of the chassis 12 of the machine 10.

In accordance with this invention, I provide a lower pad member 50 that is bolted, welded, or otherwise firmly secured to the generally horizontal portions of the elongate arms 42. Resting upon the lower pad member 50 is an upper pad member 52, in the center of which is welded or otherwise secured a slotted sleeve 54. The sleeve 54 is slotted in order to be able to properly receive the extensible fluidic actuator 56 which, in the preferred embodiment, is a hydraulic actuator attached to the hydraulic line 39. At the time of assembly, the upper pad member 52 is bolted securely to the lower pad member 50, with this connection rarely needing to be broken, except perhaps during the repair or replacement of the actuator 56.

The arms 42 are obviously of a length to permit the pad 50 to be secured between the wheel 30 and the upturned portion of the arms 42, without impairing the rotation of the wheel 30 in any way.

Firmly mounted upon the pad arrangement is the previously mentioned fluidic actuator 56 which, in a manually powered embodiment of my invention, is a hydraulic actuator much in the nature of a hydraulic jack usable around trucks and automobiles.

The upper end of the actuator 56, that is, the movable portion, is disposed in contact with a structural member located on a lower portion of said chassis, so that at such time as the actuator 56 is caused to extend vertically (lengthwise), the arms 42 are in effect caused to move away from the underside of the chassis, with this of course causing a pivoting of the framework 40 around the stationary pivot member 48, and thus causing the stabilizing wheel 32, and most importantly, the lower edges 22 of the curb mold 18, to leave the ground.

The way that the operator goes about causing the actuator 56 of this minimal expense embodiment to extend is by a pumping type manipulation of the handle 38 associated with the hydraulic pump 36. As the operator pumps the handle 38, this causes the flow of hydraulic fluid through the line 39, which in turn brings about the development of power causing the fluidic actuator 56 to extend rapidly to the desired degree.

When the extension of the actuator 56 has caused the lower edges 22 of the curb mold, as well as the second rear wheel 32, to leave the ground, it then becomes readily possible for the operator to substantially change the alignment of the machine 10 with respect to the parking lot or other such location, so that curbing can if desired be extruded in a completely different direction than the direction in which the curbing was previously being laid. After the position of the machine has been suitably realigned, it is a relatively simple manner for the operator to bring about the return of the machine to the lowered, operative position. This is accomplished by the provision of a suitable bleed valve for the operator's use, which permits the return of hydraulic fluid to its reservoir.

Figure 7:
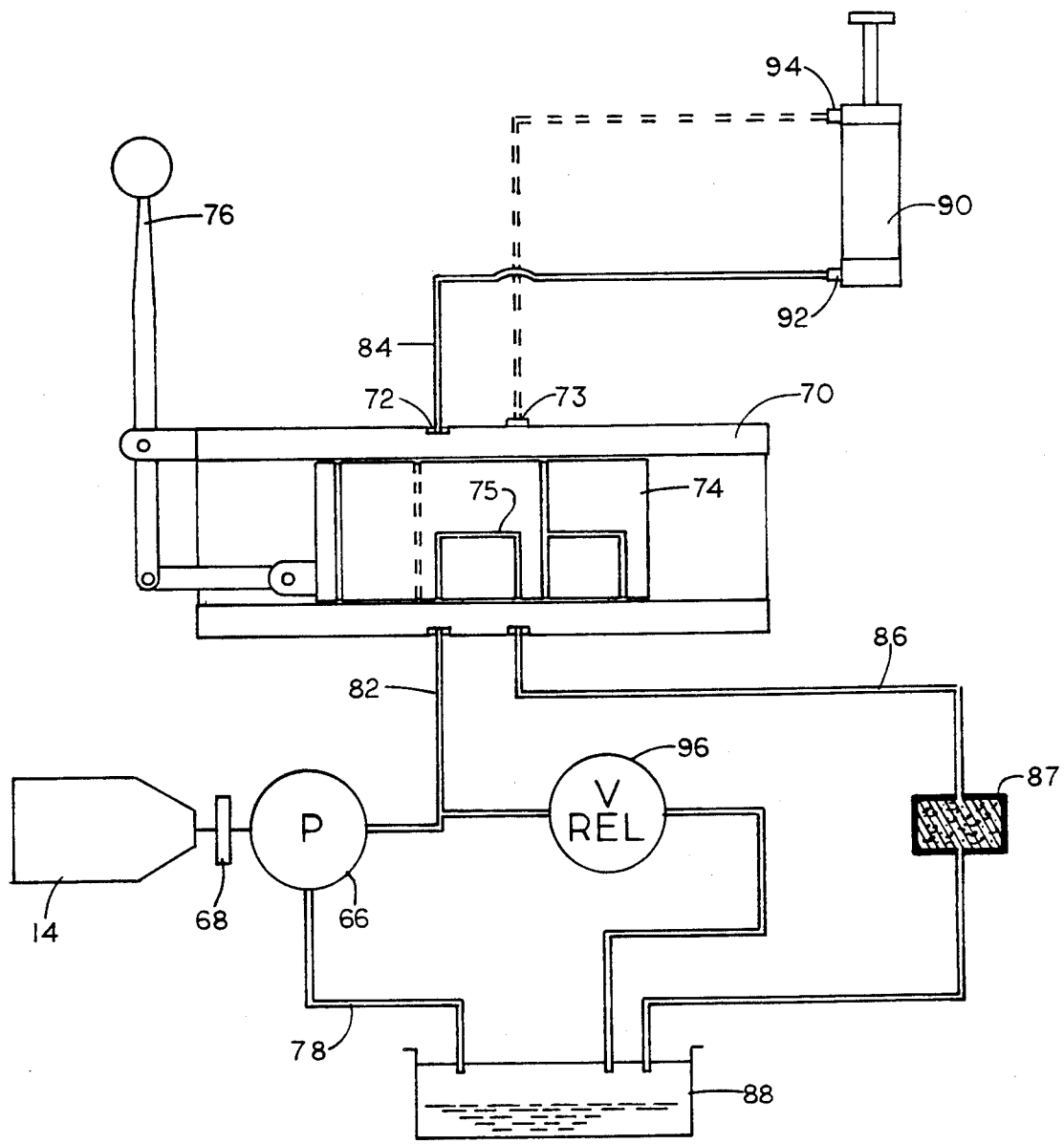
FIG. 7 is a schematic view to a comparatively large scale of an embodiment in which an engine driven hydraulic motor provides the pressurized hydraulic fluid to the actuator that causes the chassis to be lifted, the selective extension of the actuator being brought about by the use of a hydraulic control valve placed within easy reach of the operator.

I am quite obviously not required to utilize a powered height changer that involves the use of a hand operated pump 36, for it is possible to provide assistance from the engine in the form of a hydraulic pump 66 driven in rotation by the engine 14. The preferred configuration of this embodiment is shown in FIG. 7, which is a schematic view, and it will be discussed hereinafter.

Turning now to FIG. 5, it will there be seen that I have shown the machine 10 as viewed from the rear, with the curb mold 18 shown in dashed lines in order not to occlude the showing of the rotatable auger 24. In relation to the operator as he walks rearwardly, the curb mold and the auger cooperatively used therewith are offset somewhat to the right of the longitudinal centerline of the curb laying machine. Therefore, as viewed in FIGS. 5 and 6, the mold and auger are seen to be on the left hand side of the rear of the machine. Located approximately in the center of the rear of the machine 10 is the first rear wheel 30, and to the right thereof as viewed in FIGS. 5 and 6 is the second or stabilizing rear wheel 32.

Depicted alongside FIG. 5 is a fragmentary view, FIG. 5A, with this latter figure being utilized in order to reveal that the lower edges 22 of the curb mold 18 are in ground contact as the machine 10 is moving forward during the laying of curb.

FIGS. 6 and 6A, on the other hand, show how the extension of the actuator 56 provided in accordance with this invention causes the rear end of the chassis 12 to move upwardly, with this occasioning the cur b mold 18 as well as the stabilizing rear wheel 32, to leave the ground. The extended actuator 56 depicted in FIG. 6A of course brings about the lower edges 22 of the curb mold 18 being separated from ground contact, which makes it readily possible for the operator, by himself or with the assistance of the juker, to realign the machine such that the new section of curbing will be laid in the appropriate relationship to the previously laid curbing.

When the machine is to be placed on a trailer or in a truck bed, the handle 29 will enable the juker to assist the machine operator in the loading operation.

The originally manufactured Power Curbers machine pro vided for mechanically accomplished height-changing movements of the stabilizing wheel 32. While it is no longer necessary, in accordance with the present invention, for the operator to laboriously bring about height changes so that the direction of the machine can be changed, it is possible that the change from one curb mold to another by the operator will necessitate the rear end of the chassis being located a different number of inches off the ground surface than before. In such event the rotation in the pro per direction of the hand crank originally-provided on the Power Curber machine can bring about the correct height relationship of the wheel 32 to the selected curb mold 20. It is important to note that it may be necessary to use a wire brush on the threads of the height adjustment mechanism before it can be used, for concrete tends to be spilled on these threads, which does not permit proper operation thereof. This same type of difficulty is quite likely to be present with regard to the elongate screw threaded members 42 of the Rochfort Patent No. 3,890,055.

I had occasion to investigate the amount of time that is normally required to move my curb laying machine from one orientation into an adjacent new location, and I have found that in most instances, no more than thirty (30) to forty-five (45) seconds of time has elapsed from the time the curb laying machine was in one orientation, until the time the lower edges of the curb mold have lifted, moved into the desired new orientation, and then moved back into ground contact in the new orientation. This amount of time is to be understood to include the raising of the chassis to a sufficient height such that the reorientation can be readily accomplished, with the curb mold and chassis then returning to an operative position under the influence of gravity.

This minimal time is of particular consequence in a curb laying machine, for these machines are dealing with ready mixed concrete, which should be poured as rapidly as possible, due to the fact that it is setting up. The more time consumed by reorienting efforts, the more likely the concrete in the machine and/or truck will become unworkable.

Turning now to FIG. 7, I have shown a schematic diagram of a somewhat more expensive embodiment of my invention, wherein the source of fluidic pressure for selectively bringing about the raising of the chassis of my curb extruding machine is provided by the use of a hydraulic pump 66, indicated in this figure to be driven from the engine 14 through the use of a suitable coupling 68. The pump can be driven either from the drive shaft of the engine, involving the coupling 68, or from the fan chain or belt of the engine, in the manner depicted in FIG. 8. The pump 66 is of a commercially available type that provides a satisfactory flow rate of hydraulic fluid per minute. Hydraulic fluid is supplied to pump 66 from oil tank or sump 88 by means of a line 78, depicted in FIG. 7.

A hydraulic line 82 is utilized for delivering the pressurized fluid from the pump 66 to a controller in the form of a manually positioned three-way, three-position valve 70, shown quite large and noticeably out of scale in this figure, this being done in the interests of clarity. A hydraulic line 84 is utilized for delivering, on occasion, fluid from the upper fitting 72 of the valve 70 to the bottom fitting 92 of the hydraulic actuator 90.

Located inside the valve body of valve 70 is a slidable, one-piece spool member 74 having several separate, distinctly different portions or sections, with the spool member 74 typically being spring biased to its central position. When the spool member is in its central position, no fluid is being ported through the line 84 into the lower fitting 92 of the actuator 90. This is because the central portion of the spool member 74 contains a U-shaped return passage 75, such that fluid supplied to the valve body through hydraulic line 82 is returned to the line 86 through which it is redelivered to the oil tank or sump 88.

Also shown between the supply line 82 from the pump 66 and the valve 70 is a pressure relief valve 96, which has a preascertained spring setting. At such time as the pressure in line 82 exceeds a certain established amount, the excess pressure is returned from the relief valve 96 to the oil tank or sump 88.

It is to be understood that a pivoted handle 76 located convenient to the operator is functionally associated with the valve body of the valve 70, with the positioning of this handle serving on occasion to move the slidable spool member 74 away from its center position, to which it is spring biased.

As will be understood by those skilled in this art, movement of the pivoted handle 76 to the left as shown in FIG. 7 will cause the spool member 74 to move to the right, to a position in which its left section, concerned with the raising of the chassis 12, is brought into alignment with the oil supply line 82. As will be obvious, when the aforementioned left section passes the fluid from the pump 66 to the actuator 90, this causes the actuator to extend, and to cause the chassis of the curb extruding machine to lift almost immediately to such an extent that the machine can be readily moved to a new, possibly distant location. Air or fluid previously existing in the upper chamber of the actuator 90 is displaced through the upper fitting 94 of the actuator 90. When upon raising the chassis to the desired height, the handle 76 is released, the spring bias I utilize functions to return the slidable spool member 74 to its neutral position, in which the center section of the spool valve again serves to return pumped fluid to the oil tank 88. The chassis is thus held in the raised position without the need for further intervention by the operator.

As will be readily understood, by the manipulation of the handle 76 in the opposite direction, that is, to the right as shown in FIG. 7, the operator has caused the far right section of the spool member to move into alignment with the hydraulic fluid supply line 82, which makes possible the rapid lowering of the chassis. This is because a direct connection is made by the right hand side of the slidable spool member 74 between the lower end of the actuator 90, and the oil sump or oil reservoir 88. I have found that there usually is no need for connecting a hydraulic line from the right hand fitting 73 of the three-way valve 70 to the top of the actuator 90, for the weight of the machine is sufficient that gravity can be relied upon to bring the chassis back to the curb extruding position, when the pressure in the lower chamber of the actuator 90 has been released. Dashed lines in FIG. 7, however, show that if necessary a hydraulic line could be provided such that hydraulic fluid is pumped to the upper end of the actuator 90 when the spool 74 of the valve 70 has been moved such that the right hand section of the spool and the connections it contains is in contact with the pressure line 82.

As should now be clear, the pivotally mounted handle 76 is provided conveniently close to the operator, which handle has a neutral position in which no fluid is ported to the hydraulic actuator 90, as well as left and right positions, in which it serves to cause pressurized hydraulic fluid originating at the hydraulic pump 66 to be directed to either the lower end or the upper end of the hydraulic actuator 90. In this way, the operator by moving the handle 76 in a manner appropriate to move the spool 74 to its left hand section can cause the actuator 90 to extend and thereby cause the lower edges 22 of the curb mold 18 to move out of contact with the ground.

As mentioned hereinabove, gravity alone is usually relied upon to bring about the return of the lower edges 22 of the curb mold into contact with the ground, when the valve handle 76 has been manipulated to cause the spool member 74 to move to the position permitting the chassis to move to its lowered position. For that reason I typically plug the fitting 73 of the three-way valve 70, inasmuch as no hydraulic hose is normally needed to interconnect such fitting to the upper part of the hydraulic actuator 90. As mentioned previously, I show by the use of dashed lines in FIG. 7 how the valve fitting 73 can be connected to the upper fitting 94 of the actuator 90 if in some instances it becomes necessary or desirable to utilize pressurized hydraulic fluid to bring about a return of the chassis to its lowered or operating position.

It should now be clear that hydraulic line 86 connects the circulating hydraulic fluid from the valve 70 back to the oil tank 88, which may pass through a filter 87, and hydraulic line 78 serves to connect the oil tank 88 to the inlet side of the hydraulic pump 66, so that the same hydraulic fluid can be continuously reused.

Figure 8:
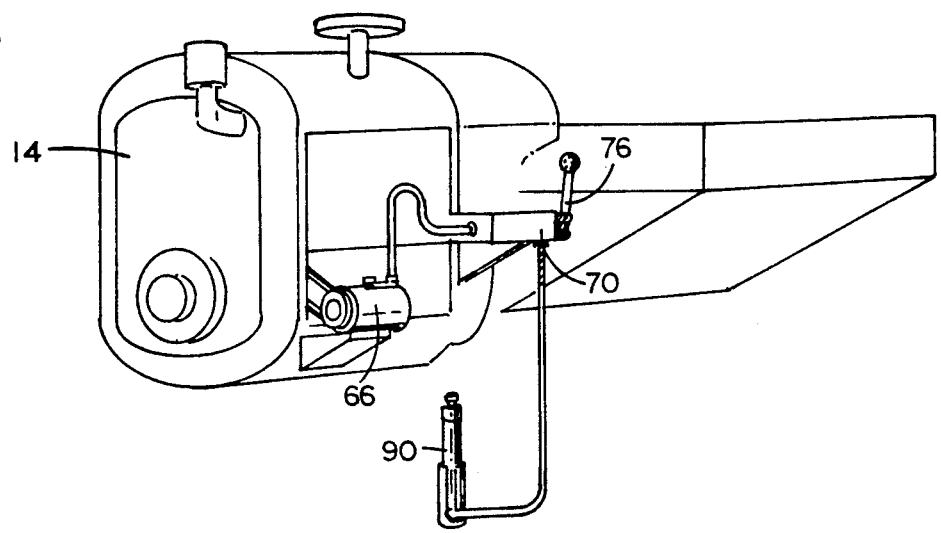
FIG. 8 is another view, but to a smaller scale, of the hydraulic system powered from the engine.

In FIG. 8 I reveal to a smaller scale, that the hydraulic pump 66 may be disposed near a convenient power output location on the engine 14, such as to be driven in rotation by the fan belt.

Figure 9:
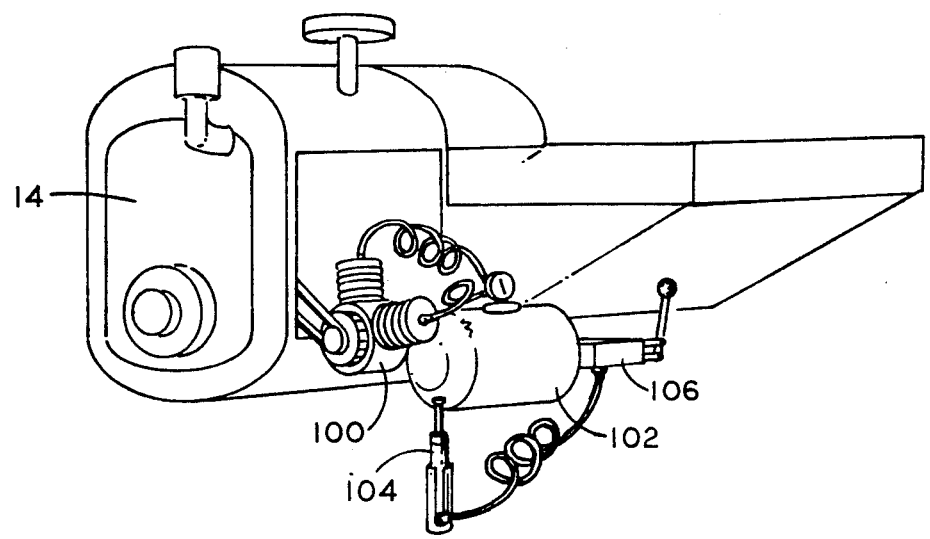
FIG. 9 is a view similar to FIG. 8, this embodiment being an engine driven, pneumatically powered system.

It was earlier indicated, that I am not to be limited to engine assisted chassis lifting arrangements that utilize hydraulic fluid, and in FIG. 9 I reveal an embodiment in which an air compressor 100 is utilized in the vicinity of the output engine 14, so as to be driven in rotation by the fan belt of the engine. The air compressor 100 is connected to a suitable compressed air storage tank 102. A controller in the form of a three way valve 106 is operatively connected to the output of the air tank 102, and is positioned so as to bring about the raising of the chassis at such time as the operator moves the handle of the valve 106 in the direction appropriate for causing the actuator 104 to extend. Leaving the handle of the valve 106 in the neutral position of course permits the chassis to stay in the raised position, whereas moving the handle to the lowered position permits the escape of air from the actuator to the atmosphere, and a return of the chassis to ground contact under the influence of gravity.

As should now be clear, my invention can take the form of a chassis lifting means powered by hand or by engine, with my novel lifting means at all times being under the close control of the operator. By appropriate manipulation of the pump handle 38 of the hand operated device, or by appropriate manipulation of the controller of the power assisted lifting devices, an exceedingly rapid and highly effective height change of the curb mold can be brought about, with a minimum expenditure of operator effort.

I claim:

1. A curb laying machine comprising a chassis, steerable front wheels supporting a forward portion of said chassis, and at least one rear wheel mounted on a rearward portion of said chassis, an engine carried on said chassis, and a curb mold mounted on the underside of a rear portion of said chassis with its lower edges normally in ground contact, said curb mold containing a rotatable auger driven in rotation by the engine, with the rotation of the auger bringing about the extrusion of curbing through said curb mold onto the ground as the machine moves slowly forward, the improvement comprising a height changing mechanism in operative relationship with said rear wheel, said rear wheel being located in the vicinity of said curb mold, said height changing mechanism including the use of an extensible fluidic actuator under control of an operator of said machine, said actuator being mounted in an operative relationship with said rear wheel, said actuator serving, when caused by the machine operator to extend, to bring about a degree of lifting of the rear portion of said chassis, thus to remove the lower edges of said curb mold from ground contact, and thereby enabling the operator to turn or move said machine to a new operative position, and a bleed valve under control of the operator, located in the fluid line in which said extensible fluidic actuator is operatively disposed, the opening of said bleed valve enabling said extensible fluidic actuator to rapidly return, under the bias provided by the weight of said chassis, to its non-extended condition, thereby enabling the lower edges of said curb mold to return promptly into contact with the ground, whereby the operator can immediately resume the curb laying operation in the new operative position.

2. The curb laying machine as recited in claim 1 in which said extensible fluidic actuator is a hydraulic actuator under the control of the operator.

3. The curb laying machine as recited in claim 2 in which an operator manipulated hydraulic pump is utilized for supplying pressurized hydraulic fluid to said hydraulic actuator on an as needed basis.

4. The curb laying machine as recited in claim 2 in which an engine driven hydraulic pump is the source of the fluid selectively utilized by the operator for powering said extensible hydraulic actuator.

5. The curb laying machine as recited in claim 1 in which said extensible fluidic actuator is pneumatically operated.

6. In a curb laying machine designed to extrude curbing of molten asphalt or concrete in a parking lot or the like, with the machine utilizing a wheeled chassis, a curb mold carried on a lower portion of said chassis, with the lower edges of said curb mold in contact with the ground during the laying of curbing, and an engine driven auger for bringing about the extrusion of curbing through said curb mold as the machine moves slowly forward, said machine comprising a chassis, steerable front wheels supporting a forward portion of said chassis, and at least one rear wheel mounted on a rearward portion of said chassis, an engine carried on said chassis, and a curb mold mounted on the underside of a rear portion of said chassis and containing a rotatable auger driven in rotation by the engine, the improvement comprising a height changing mechanism in operative relation with said rear wheel, said rear wheel being located in the vicinity of said curb mold, said rear wheel being disposed upon a framework connected to an extensible fluidic actuator under control of an operator of said machine, said actuator serving, when caused by the machine operator to extend, to bring about a degree of lifting of the rear portion of said chassis, thus to remove the lower edges of said curb mold from ground contact, and thereby enabling the operator to turn or move said machine to a new operative position, and a bleed valve under control of the operator, located in the fluid line in which said extensible fluidic actuator is operatively disposed, the opening of said bleed valve enabling said extensible fluidic actuator to rapidly return, under the bias provided by the weight of said chassis, to its non-extended condition, thereby enabling the lower edges of said curb mold to return promptly into contact with the ground, whereby the operator can immediately resume the curb laying operation in the new operative position.

7. The curb laying machine as recited in claim 6 in which said extensible fluidic actuator is a hydraulic actuator under the control of the operator.

8. The curb laying machine as recited in claim 7 in which an operator manipulated hydraulic pump is utilized for supplying pressurized hydraulic fluid to said hydraulic actuator on an as needed basis.

9. The curb laying machine as recited in claim 7 in which an engine driven hydraulic pump is the source of the fluid selectively utilize d by the operator for powering said extensible hydraulic actuator.

10. The curb laying machine as recited in claim 6 in which said extensible fluidic actuator is pneumatically operated.

11. In a curb laying machine designed to extrude curbing of molten asphalt or concrete in a parking lot or the like, with the machine utilizing a wheeled chassis, a curb mold removably carried on a lower portion of said chassis, with the lower edges of said mold in contact with the ground during the laying of curbing, and an engine driven auger for bringing about the extrusion of curbing through said curb mold as the machine moves slowly forward, said machine comprising a chassis, steerable front wheels supporting a forward portion of said chassis, and first and second rear wheels mounted on a rearward portion of said chassis, an engine carried on said chassis, and a curb mold removably mounted on the underside of a rear portion of said chassis, a rotatable auger mounted in an operative relationship to said curb mold, said auger being driven in rotation through speed reduction means from said engine, the improvement comprising a height changing mechanism associated with said first rear wheel, latter wheel being located in the immediate vicinity of said curb mold, said first wheel being disposed upon a pivoted framework mounted on a lower portion of said chassis, an extensible fluidic actuator under control of an operator of said machine, said actuator being mounted in an operative relationship to said pivoted framework, and serving, when caused by the operator to extend, to bring about a degree of lifting of the rear portion of said chassis, thus to remove the lower edges of said curb mold from ground contact, and thereby enabling the operator to turn or move said machine to a new operative position, and a bleed valve under control of the operator, located in the fluid line in which said extensible fluidic actuator is operatively disposed, the opening of said bleed valve enabling said extensible fluidic actuator to rapidly return, under the bias provided by the weight of said chassis, to its non-extended condition, thereby enabling the lower edges of said curb mold to return promptly into contact with the ground, whereby the operator can immediately resume the curb laying operation in the new operative position.

12. The curb laying machine as recited in claim 11 in which said extensible fluidic actuator is a hydraulic actuator under the control of the operator.

13. The curb laying machine as recited in claim 12 in which an operator manipulated hydraulic pump is utilized for supplying pressurized hydraulic fluid to said extensible hydraulic actuator on an as-needed basis.

14. The curb laying machine as recited in claim 12 in which an engine driven hydraulic pump is the source of the fluid selectively utilize d by the operator for powering said extensible hydraulic actuator.

15. The curb laying machine as recited in claim 11 in which said extensible fluidic actuator is pneumatically operated.

* * * * *